United States Patent [19]

Rathi

[11] Patent Number: 4,679,210

[45] Date of Patent: Jul. 7, 1987

[54] SOFT-LIMITED DIGITAL PULSE COMPRESSOR

[75] Inventor: Devdas D. Rathi, Los Angeles, Calif.

[73] Assignee: ITT Gilfillan, a division of ITT Corporation, Van Nuys, Calif.

[21] Appl. No.: 756,480

[22] Filed: Jul. 18, 1985

[51] Int. Cl.$^4$ ............................................. G06F 15/34
[52] U.S. Cl. ..................................... 375/96; 342/145; 375/122; 364/728
[58] Field of Search ...................... 375/1, 96, 114, 115, 375/116, 122; 343/5 DP, 17.1 R; 364/728, 819, 820; 364/146.2; 342/108, 145

[56] References Cited

U.S. PATENT DOCUMENTS

| | | | |
|---|---|---|---|
| 3,760,355 | 9/1973 | Brucket ................................ | 375/116 |
| 4,156,923 | 5/1979 | Lampe et al. ......................... | 364/819 |
| 4,224,679 | 9/1980 | Nossen et al. ......................... | 364/819 |
| 4,400,790 | 8/1983 | Chambers et al. .................... | 364/819 |
| 4,506,372 | 3/1985 | Massey et al. ........................ | 375/116 |

Primary Examiner—Benedict V. Safourek
Attorney, Agent, or Firm—Robert A. Walsh; Mary C. Werner

[57] ABSTRACT

A circuit is provided for correlating both the phase and amplitude of received radar signals with the phase of a transmitted binary reference phase code, which enables implementation by off-the-shelf hardware. The received signal is demodulated and quadrature detected, and each segment of small duration of the received signal is converted to a three-bit data code word, with each data word defining both the phase and the amplitude of the demodulated received signal. Each bit of the same significance (e.g., most significant bit or least significant bit) of a series of data words is delivered to a different one of a group of one-bit correlators. Each correlator correlates the series of bits of the same significance from a sequence of data words, with the bits of the binary reference phase code. The outputs of the correlators whose bits represent the amplitude of the received signal, are multiplied according to the significance or position of the bit, and the products are added.

15 Claims, 5 Drawing Figures

SOFT-LIMITED DIGITAL PULSE COMPRESSOR

BACKGROUND OF THE INVENTION

In communication, radar detection, and other applications, the binary frequency or phase encoding of a received signal is detected by comparing it to a binary reference code. Such comparison can be conducted in a pulse compressor which may include a correlator that correlates the series of bits of the demodulated received signal with the series of bits of the reference code. Since the demodulated received signal varies in amplitude as well as phase, a better correlation could be obtained by also taking into account the amplitude of each segment of small duration, of the received signal. However, no high speed correlators for real time correlation are available, which can make such a comparison, and it had been thought that the cost of designing and constructing a custom integrated circuit or the like to make such an amplitude-dependent correlation would be prohibitive. A pulse compressor which could take into account the amplitude as well as the phase of each of numerous segments of a received signal when correlating it with a reference code, using only commonly available ("off-the-shelf") circuit components, or available designs, would be of considerable value.

SUMMARY OF THE INVENTION

In accordance with one embodiment of the invention, a circuit is provided for correlating both the amplitude and phase of a received signal with a binary reference phase code, which can be implemented with already available hardware or hardware designs. Each of a series of segments (each of limited duration) of the demodulated analog received signal is converted to a multi-bit data word. Each data word defines both the amplitude and phase of the received signal. Each bit of the same position, or significance, of each data word in a series of data words, is delivered to a different one of a group of one-bit correlators. Each correlator correlates the series of bits of a particular position, with the reference phase code. The outputs of the correlators whose data bit positions represent the amplitude of the received signal, are multiplied by a whole number. The least significant bit may be multiplied by one, and bits of higher significance are multiplied by progressively higher powers of two, as by left shifting the bits. The multiplied outputs are added, and the sum represents the degree of correspondence of the data and reference codes when they are well matched.

One correlator can receive the MSB (most significant bit) of each data code, which can represent the phase of the received signal, and correlate it with the reference code. The output of this correlator is left shited by a digit representing the significance of the MSB. The product may be bit complemented, and the result added to the multiplied outputs of the other correlators. An additional correction is made by adding a number dependent on the number representation that is chosen (e.g., two's complement or one's complement).

The novel features of the invention are set forth with particularity in the appended claims. The invention will be best understood from the following description when read in conjunction with the accompanying drawings.

DETAILED DESCRIPTION OF AN EMBODIMENT OF THE INVENTION

Figure 1:
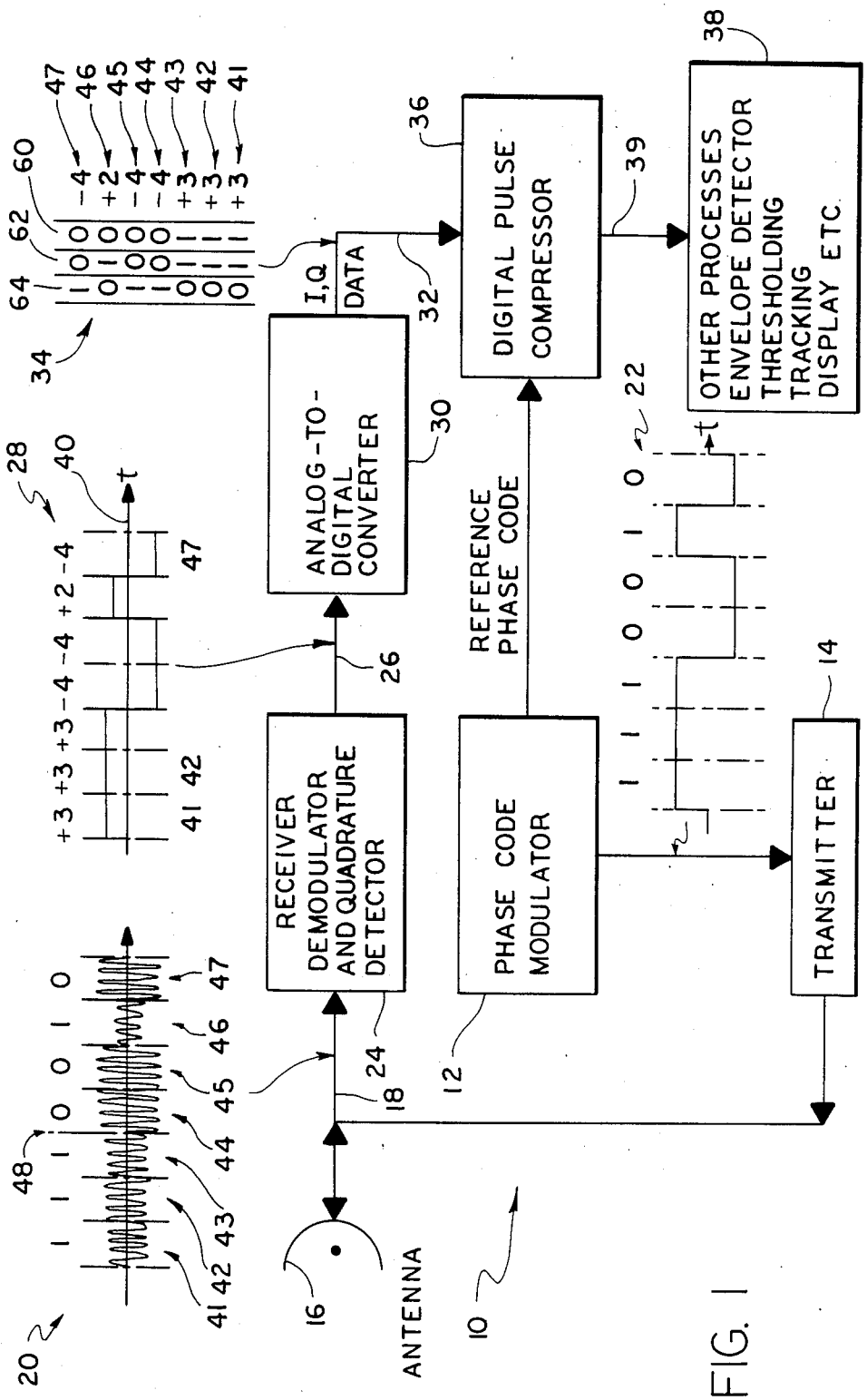
FIG. 1 is a block diagram view of a transmit and receive system, with one example of transmitted and received codes being noted in the diagram.

FIG. 1 illustrates a radar system 10 which transmits bursts of encoded signals at intervals from an antenna 16. The encoded portions are encoded by an output of a phase code modulator 12. In a particular example indicated in the figure, the output of the phase code modulator 12 is a series of seven digits of the sequence: "1110010." Each "0" can be represented as a "−1" instead. The output of the phase code modulator 12 is delivered to a transmitter 14 to phase modulate a carrier wave. While the carrier wave may have a high frequency such as 1 gigahertz, the phase changes along the output (reference phase code 22) generated by the modulator 12 may have a repetition rate of 1 megahertz, and the reference code 22 of seven microsecond duration may be repeated once every millisecond. The output of the transmitter 14 is delivered (as through a duplexer, not shown) to the antenna 16 which is aimed at a target. A brief time later, the signal received by the antenna on line 18 may be an approximately 1 gigahertz signal that is phase and amplitude modulated.

In the example shown in FIG. 1, it is assumed that the modulation of the received signal indicated at 20 is a very good, though not perfect, match for the transmitted signal as modulated by the reference phase code indicated as 22. The received signal 20 passes through a receiver 24 which includes a demodulator and quadrature detector. The output from the receiver 24, on line 26, is a demodulated and quadrature detected received signal indicated at 28. This signal passes through an analog-to-digital converter 30 whose output line 32 contains data words representing the demodulated received signal 28. In the example, the transmitted and received signals are divided into seven segments (each of about one microsecond duration) which each have a phase and amplitude. The output of the converter 30 is a sequence of seven data words indicated at 34, each word defining in two's complement arithmetic, the phase and amplitude of the signal during a particular time period or segment, there being seven words that each defines the characteristics of one segment of the received signal 20. The output from the converter 30 can be passed through a filter (not shown) to filter out clutter and the like, and is then delivered to a digital pulse compressor 36.

The digital pulse compressor 36 receives the output of the phase code modulator 12, which is the binary reference phase code shown at 22. The compressor 36 compares the reference code 22 to the series of multi-bit data words 34 to determine the degree of correlation of each bit of the reference code 22 to each word of the series of data words 34. The output of the compressor 36 is delivered to a plurality of other processing apparatus 38, which may include an envelope detector, a threshold detecting circuit, a tracker and a display, or other circuitry. The output of the compressor on line 39 is a digital number, for each received signal, which represents the degree of correlation of the received signal 20 with the reference code 22.

It can be seen, by comparing the received signal 20 with the demodulated signal 28, that the amplitude of the demodulated signal 28 (height above or below the zero line 40) depends upon the amplitude of the corresponding segment of the received signal 20. The segments are labeled 41–47. The next to last segment 46 has the lowest amplitude of all segments, while the segments 44, 45, and 47, have the greatest amplitude. The phase of the received signal 20 remains constant up to the point 48, when it undergoes a 180° phase change. Accordingly, segments 44 and 45 remain at a 180° phase difference from the preceding portion of the carrier wave, and are shown as having a negative value in the demodulated signal 28. At the beginning of the sixth segment 46 of the received signal 20, there is another 180° phase change, so segment 46 in a demodulated signal 28 is shown as positive.

The data code words 34 from the output of the analog to digital converter 30 are three-bit words in the example, and therefore can represent eight different levels. In order to represent eight different levels, with each level including a phase that may be positive or negative, applicant has used two's complement arithmetic to assign three different positive amplitudes, four different negative amplitudes, and a zero amplitude. It is also possible to use one's complement arithmetic, which is symmetric about zero but defines only seven levels. The following table shows the equivalent for each of the eight possible 3-bit words and a decimal equivalent, for two's complement and one's complement arithmetic:

| 3-bit Data Word | Two's Complement Decimal Equivalent | One's Complement Decimal Equivalent |
|---|---|---|
| 000 | 0 | 0 |
| 001 | 1 | 1 |
| 010 | 2 | 2 |
| 011 | 3 | 3 |
| 100 | −4 | −3 |
| 101 | −3 | −2 |
| 110 | −2 | −1 |
| 111 | −1 | 0 |

In a hard-limited digital pulse compressor which is used in most prior art systems, only the phase of the received signal 20 is compared with the reference phase code 22, so a series of words are compared that are each one-bit words. In that case, an off-the-shelf comparator can be used as the digital pulse compressor 36. However, in applicant's soft-limited system wherein the amplitude as well as the phase of the received or data signal 20 is to be compared with the reference code 22, it was thought that a special custom integrated circuit would have to be designed and built to perform the digital pulse compression. Applicant is able to use prior art single bit correlators and other off-the-shelf items to perform soft-limited digital pulse compression, or use known one bit correlator designs for the correlators in a single chip multi-bit correlator which may be part of an integrated pulse compressor circuit.

Figure 2:
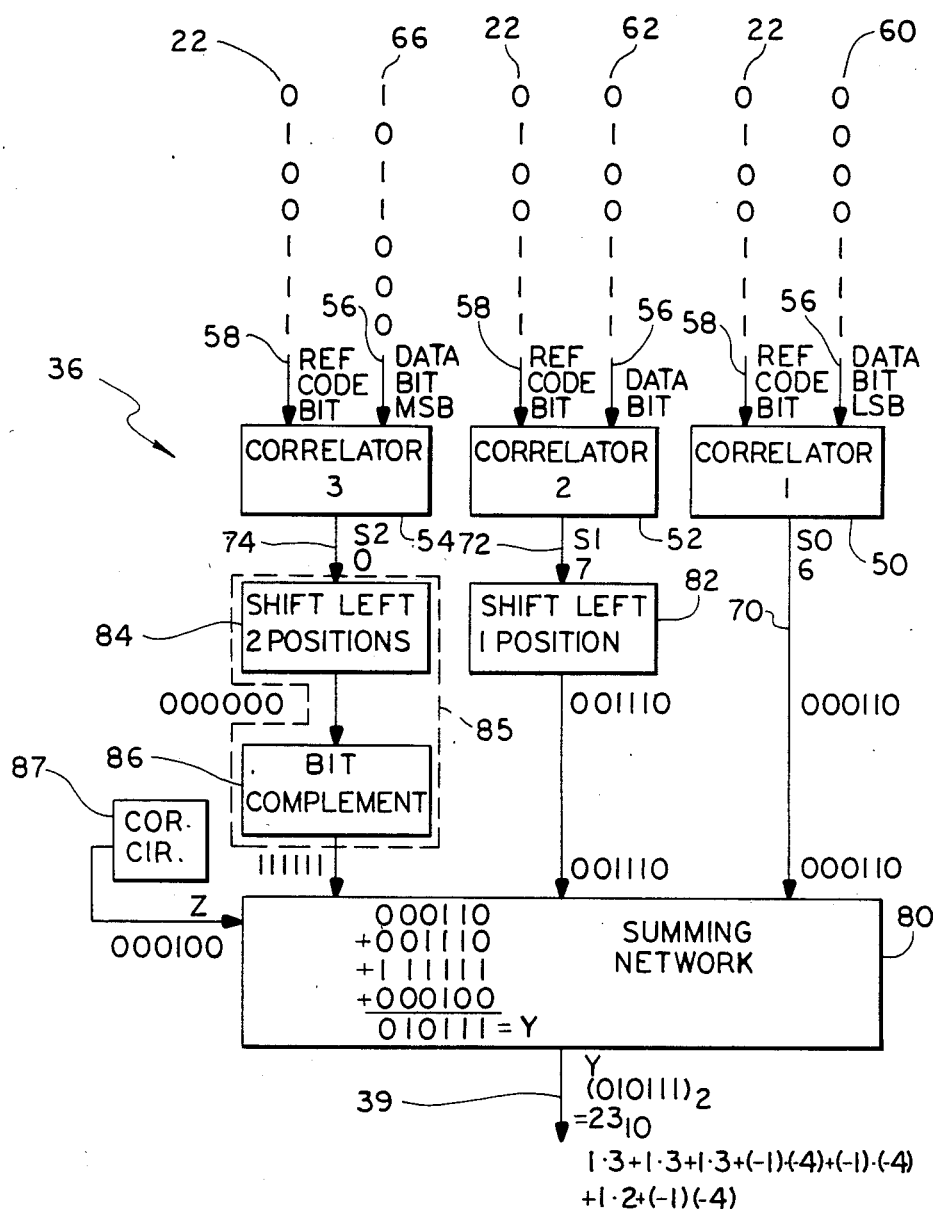
FIG. 2 is a block diagram of a digital pulse compressor of the system of FIG. 1, noted in the diagram.

FIG. 2 illustrates a soft-limited digital pulse compressor 36, which can correlate each of a series of multi-bit data words with the series of digits of a binary reference phase code. This example uses two's complement arithmetic. For the correlation of a data word which has three bits, applicant uses three correlators 50, 52 and 54. Each correlator has two inputs, including a data bit input 56 which receives one bit of each data word, and a reference code input 58 which receives the bits of the reference code 22, there being seven of such bits in this example. The first correlator 50 receives the seven LSBs (least significant bits) 60 of the seven data words 34, at its data bit input 56. Correlator 50 receives the seven bits of the reference code 22 on its reference code input 58. The second correlator 52 receives the second from LSBs 62 on its data bit input 56 and receives the reference code on its reference code input 58. The third correlator 54 has a data bit input 56 which receives the MSBs 66 on its data bit input 56, and the reference code 22 on its reference code input 58. Since the first two correlators 50, 52 receive bits representing amplitude, these correlators can be considered to be amplitude correlators, while correlator 54 can be considered to be a phase correlator.

Each correlator generates a number $S_0$, $S_1$, or $S_2$ on its output 70, 72, or 74 which indicates the number of matches. In the correlator 52, the match between the second from LSBs 62 and the reference code 22 is a perfect match, so the output is a maximum, which is seven. For correlator 50, all but one set of bits match, so the output is one less than the maximum, and is therefore six. For correlator 54, there is zero matching, and therefore the output on line 74 is zero. Since these outputs will (after processing of the output of phase-indicating correlator 54) be added, each correlator output is multiplied by a digit corresponding to its significance or position.

The output 70 of the LSB correlator 50 may be said to be multiplied by one, and its output is delivered to an adder 80. Since the output on line 70 is "six" in decimal form, it is "000110" in the most common binary code. The output of the second correlator 52 is multiplied by two by a transform means or circuit 82. Actually, the "circuit" 82 does not require any hardware, as a shift is accomplished by connecting each of six outputs from correlator 52 to a next higher position. Since the output from the correlator 52 is in binary form, the multiplication is performed by shifting the level of all bits to the left by one (with the rightmost bit being zero). Thus, the decimal output of "seven" from the correlator 52 is multiplied by two so it equals "fourteen" in decimal base, and equals "001110" in two's complement base. The output of the last correlator 54 is delivered to a transform means 85 which includes a "circuit" 84 which multiplies the output by four by shifting the position of all digits to the left by two spaces. Since the output of the correlator 54 is zero, the output of the "circuit" 84 is zero. Because the analog-to-digital converter 30 in this example uses two's complement arithmetic, the transform means 85 also includes a bit complement circuit 86. The output of the most significant bit multiplier 84 passes through the bit complement circuit 86 (which is merely a group of inverters) which generates the complement of the product from circuit 84. The output of the circuit 86 is delivered to the adder 80. In addition, a correction term Z from a correction circuit 87 is added to the adder, with Z in this example (which uses two's complement arithmetic) equaling the number of zeroes (or −1's) in the reference code 22 plus one. The reference code has three zeroes, so Z equals 4.

The adder 80 in this example adds the four quantities inputted to it, and yields an output equal to "010111" in binary form, which is "23" in decimal form. (The output is the same in one's complement as two's complement for positive numbers.) This sum is equal to each amplitude in the demodulated detected signal 28 (FIG. 1) times a corresponding bit in the reference phase code 22 (except that each "0" in the reference code must be changed to a "−1" so the reference code is "111-1-11-1") as follows:

$$23 = 1\cdot 3 + 1\cdot 3 + 1\cdot 3 + (-1)\cdot(-4) + (-1)\cdot(-4) + 1\cdot 2 + (-1)(-4)$$

Thus, the pulse compressor output does equal the sum of the level of each received segment 41–47 times a corresponding bit of the reference code.

The circuit of FIG. 2 can be constructed by using three commonly available single bit correlators, such as TRW 64 bit digital output correlator, Model TDC1023J (which has a capacity of 64 bits) or equivalent. The multiplier or shift left circuits 82 and 84 do not require hardware. The bit complement circuit 86 comprises a group of inverters. The summing network or adder 80 can be a Texas Instruments adder Model 54S283 or equivalent. By connecting the components as shown in FIG. 2, a soft-limited pulse compressor can be constructed using available (binary) equipment, to avoid the necessity of trying to design and build an integrated cicuit which correlates a series of multi-bit words with a single bit reference code 22. Alternatively, an integrated circuit can be constructed, using known designs for one-bit correlators (and known designs for the other circuits).

Applicant has derived the above-described circuit by considering the fact that the basic digital pulse compressor 36 output Y, may be defined as:

$$Y = \sum_{n=1}^{N} C_n X_n \qquad \text{Eq. 1}$$

where N equals the length of the reference code, $C_n$ is the nth bit (equal to 1 or −1) in the reference code C, and $X_n$ equals the nth word of the input data sequence to be correlated. We can rewrite equation 1 in another fashion if we represent "1" as logical 1 and "−1" as a logical 0; also, if we define a quantity M as the number of "−1's" in the reference code of length N; and if we use a "k" bit two's complement representation for the soft-limited input data sequence $X_n$. It is noted that taking the two's complement of a given binary number is the same as taking the one's complement of this number and adding one to it. Since the quantity M (the number of "−1's" in the phase code of length N) is known, then it is known that M "1's" plus one are to be added to obtain the corrected pulse compressor output. Equation 1 can be rewritten as the following equation 2:

$$Y = \left( \sum_{n=1}^{N} \overline{X}_{n,0} \right) 2^0 + \left( \sum_{n=1}^{N} \overline{X}_{n,1} \right) 2^1 \ldots + \qquad \text{Eq. 2}$$

$$\left( \sum_{n=1}^{N} \overline{X}_{n,j} \right) 2^j + \ldots \left( \sum_{n=1}^{N} \overline{X}_{n,k-2} \right) 2^{k-2} +$$

-continued $$\left( \sum_{n=1}^{N} \overline{X}_{n,k-1} \right) \cdot 2^{k-1} + Z$$

where Y equals the pulse compressor output, N equals the number of bits in the reference code, $\overline{X}_{n,j}$ equals $X_{n,j}$ for $C_n = 1$ or the bit complement of $X_{n,j}$ where $C_n$ equals 0 or −1. In this derivation the correction term Z equals the number of "−1's" in the phase code of length N plus one. The * implies one's complement.

The fact that the bit complement of $X_{n,j}$ can be used for $C_n = 0$ ( or −1), suggests that the logical operation EXCLUSIVE NOR can be used; also, the terms in parenthesis in equation 2 suggest that equation 2 can be rewritten as follows:

$$Y = S_0 \cdot 2^0 + S_1 \cdot 2^1 + \ldots + S_j 2^j + \ldots + S_{k-2} \cdot 2^{k-2} + S_{k-1} \cdot 2^{k-1} + Z \qquad \text{Eq. 3}$$

where:

$$S_j = \sum_{n=1}^{N} X_{n,j}; \text{ for } j = 0,1,2 \ldots k - 1. \qquad \text{Eq. 3}$$

Note that where the input data representation is in one's complement, then the correction term Z equals $S_{k-1}$ and where the input data representation is in two's complement, then the correction term equals the number of −1's in the reference phase code plus one.

Equation 3 suggests the hardware implementation shown in the example in FIG. 2 for the digital pulse compressor 36. The output of the least significant bit correlator 50 in FIG. 2 is the term $S_0$ which is multiplied by $2^0$ (which, of course, equals one). The output of the second from the least significant bit correlator 52 is the term $S_1$ multiplied by $2^1$. In the example of FIG. 2 there is only one additional correlator which is correlator 54 whose output is not only multiplied by $2^{k-1}$, where $k-1$ is the number of terms in the equation and the number of correlators, but where the bit complement of the last term is used. Also, the correction term Z (the number of −1's plus one for two's complement, or the output of correlators 54 for one's complement) is added.

Of course, the length of the reference code 22 and the length of the received signal 20 can be varied, and typically includes about sixty-three bits for the reference code 22 and an equal number of multi-bit data words 34, in radar applications. Detection of the amplitude of each segment of the received signal 20, can be made not only along eight binary levels as shown in the example of FIG. 2, but can be made for a large number of additional levels. An additional bit is required every time the number of levels is multiplied by two, so that a four-bit data word would be required to discriminate between sixteen different phase-and-amplitude levels.

Figure 3:
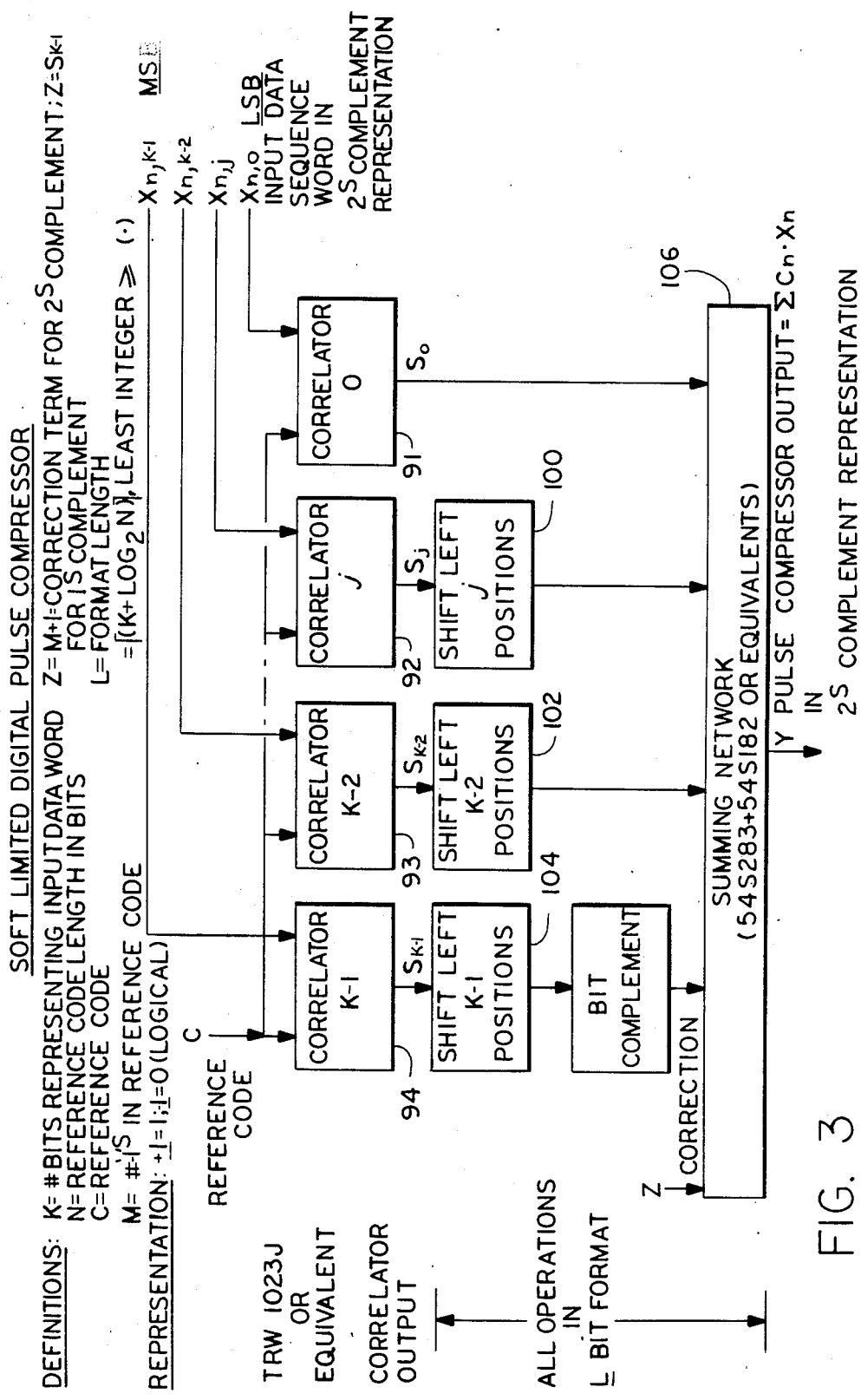
FIG. 3 is a block diagram of a general digital pulse compressor for a system using data words of any bit length.

FIG. 3 illustrates a generalized system for soft-limited pulse compression of a received and demodulated series of multi-bit data code words, where each word has a number k of bits. A corresponding number k of correlators is used, one for each bit position or significance in the data word. FIG. 3 shows four of such correlators 91–94. It is noted that, because of the progressively higher shifts (multiplications) for the more significant bits, all operations following the shifts at 100–104 require that the arithmetic operation be performed using binary words with a greater number of digits L (in FIG.

2, L equals 6 in that the output of circuit 86 is a 6-bit word). Again, the correction term Z equals the number of "−1's" in the reference code plus one, for two's complement representation, and equals the output of correlator 94 for one's complement representation. The output Y from the summing network 106 is a pulse compression output in one's or two's complement representation, depending on the representation of the data words.

Figure 4:
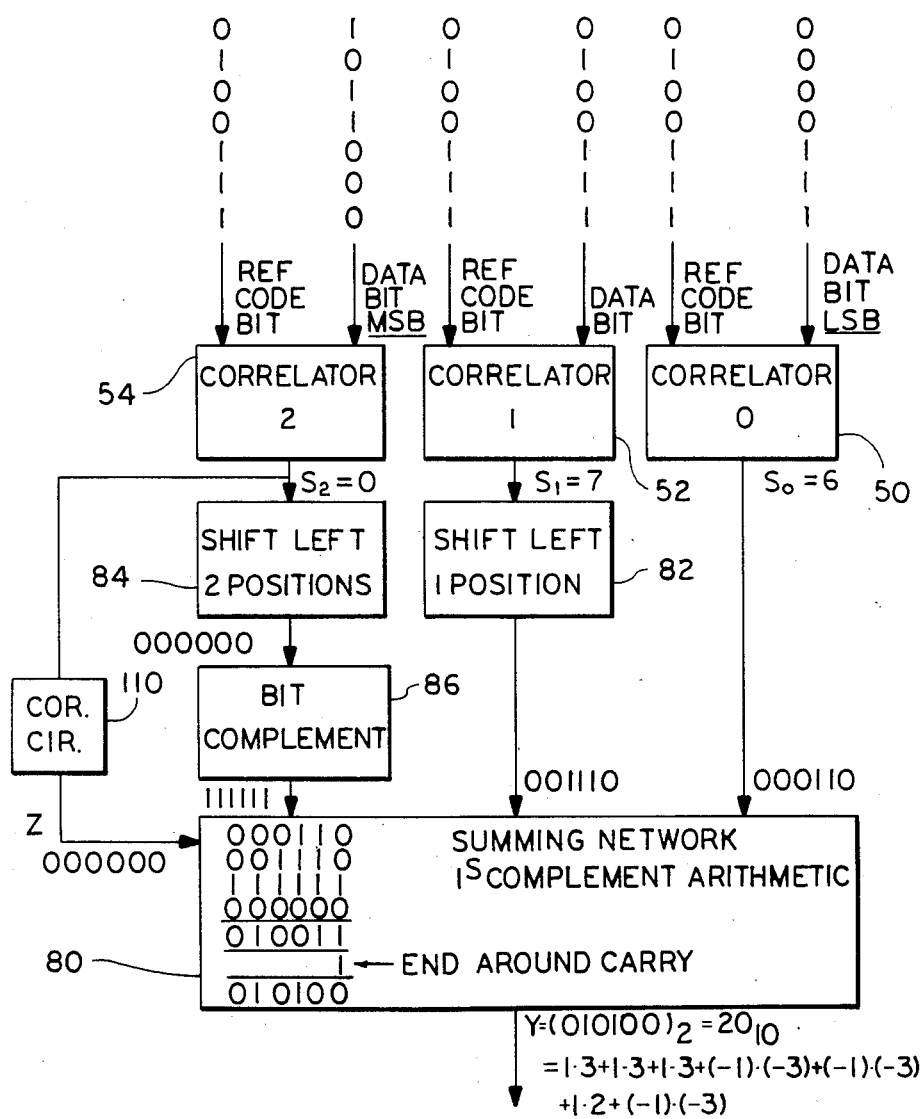
FIG. 4 is a block diagram similar to that of FIG. 2, but using a one's complement representation.

Instead of implementing the system by using two's complement arithmetic, it is possible to implement the system with one's complement arithmetic. FIG. 4 shows a system similar to that of FIG. 2 for the same reference code 22 and the same demodulated received signal 28 of FIG. 1, but with the pulse compression implemented with one's complement arithmetic. The maximum values of segments 44, 45 and 47 are −3, instead of the level of −4 obtained in two's complement. The correction circuit 110 merely delivers the output of correlator 54 to the adder 80.

Figure 5:
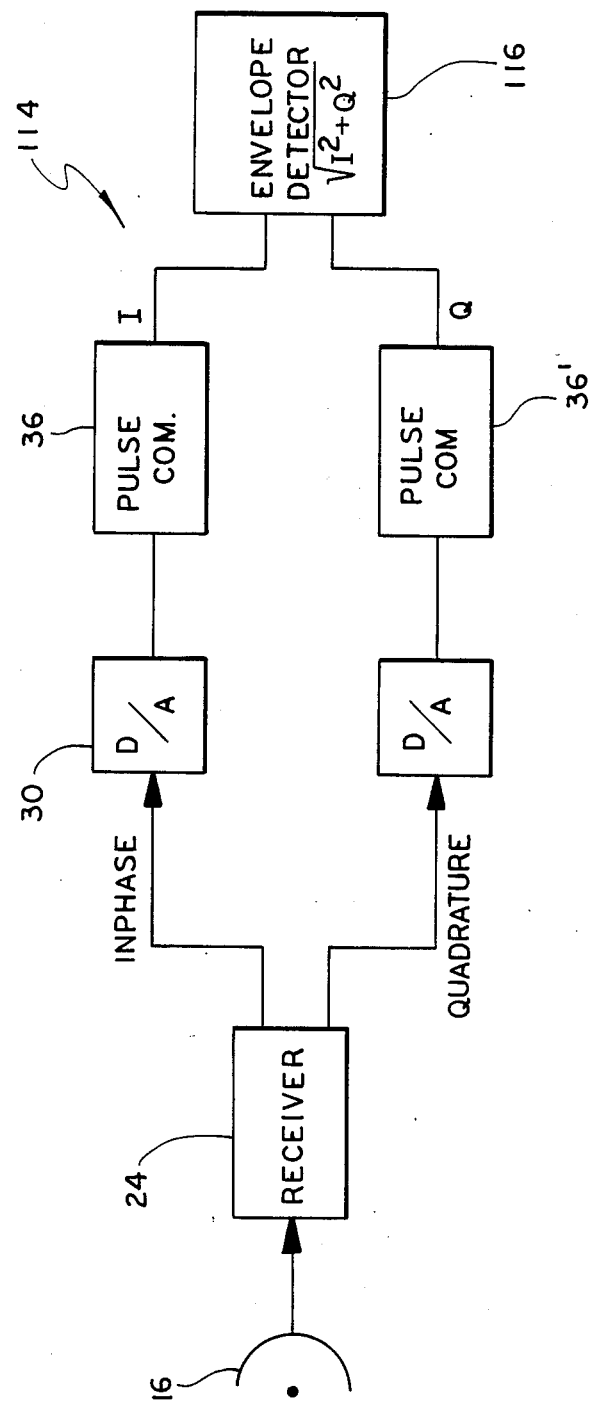
FIG. 5 is a block diagram of a complete system.

An actual system requires dual channels, one for the inphase data and the other for the quadrature data from the receiver. FIG. 5 shows a system 114 which uses two identical phase compressors 36, 36' of the type shown in FIG. 2, one for inphase data and the other for quadrature data, and with the outputs of the two pulse compressors 36, 36' combined in an envelope detector 116. Applicant has built a two channel, 3-bit word, 255-bit code pulse compressor system. Four correlators, each with a 64-bit capacity (to essentially form a 256-bit correlator), were used for each bit of the data, with a total of twelve correlators for each channel (for each pulse compressor).

Thus, the invention provides an apparatus and method for correlating a reference code 22 with a detected received signal 20, with correlation not only of the phases but also of the relative amplitudes of the received signal 20 with the reference code 22. This is accomplished by processing each digit of a multi-digit word 34, which represents both the amplitude and phase of each segment of the received signal 20, with the reference code 22. Single bit correlators 50, 52, 54 can be used which are off-the-shelf components that are readily available. A set of two or more correlators can be used for each data word bit, where the length of the reference code 22 exceeds the capacity (e.g., 64 bits) of an available correlator. The output of each correlator 50, 52, 54 is shifted (for multiplication) by a digit which equals the significance or position of the digit correlated by that correlator 50, 52, 54, with the output of the least significant digit not shifted. The output of the MSB correlator 54, which can represent the correlation of the phase of the received signal 20 with the reference code 22, is bit complemented 86 before delivery to a summing network 80. A correction factor 110, 87 dependent upon the number representation chosen (ones's complement or two's complement) is also added to the summing network 80. The sum generated by the summing network 80 is a number representing the degree of correlation between the reference code 22 and the received signal 20.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for the soft-limited pulse compression of a plurality of phase-modulated received signals, with respect to a binary reference phase code received from a reference phase code source, comprising:

a receiver circuit means for demodulating the received signals and for generating a series of multi-bit digital data words, each data word having a number of bits equal to k, where k is a positive integer, and with said data words of k bits representing the demodulated signals, each word of k bits representing the phase and one of a plurality of possible amplitudes of the demodulated received signal during a limited time period;

a number k of correlators, each having a pair of input terminals and an output terminal, a first of said input terminals coupled to said circuit means to receive one of the bits of predetermined significance of each digital word, and a second of said input terminals coupled to a reference phase code source, for correlating a group of successive data word bits of predetermined significance of successive data words with the reference code;

an adder means having a plurality of input signals and an output terminal, for generating an output signal which represents the sum of the inputs;

a plurality of transform means, each having an input terminal coupled to the output terminal of a selected correlator and each having an output terminal coupled to said adder means for multiplying the output from said selected correlator by a predetermined integer corresponding to the significance of the bits of the digital code received by the corresponding selected correlator, the transform means which is coupled to the correlator which receives the most significant bit of the digital code, delivering on its output the bit complement of $2^{k-1}$ times the output of the correlator which receives the most significant bit.

2. The apparatus described in claim 1 wherein:
k equals 3;
said receiver circuit means having three output lines and generating a series of 3-bit data words, each bit of predetermined significance being delivered over a separate one of the three output lines;
said plurality of correlators include three correlators, including a least significant bit (LSB) correlator which receives a series of least significant bits of the 3-bit data words, a most significant bit (MSB) correlator which receives a series of the most significant bits of the 3-bit data words; and a second most significant bit correlator which receives a series of the second most significant bits of the 3-bit data words;
said plurality of transform means includes a conductor which delivers an output signal of the LSB correlator to the adder without change, a second transform means which delivers an output signal of the second most significant correlator shifted by one place to the adder, and a third transform means which delivers the bit complement of an output signal of the MSB correlator shifted by two places to the adder.

3. The apparatus described in claim 1 wherein:
said circuit means detects eight different levels of the demodulated received signal during each limited time period, and assigns one of a plurality of two's complement data words to the demodulated received signal during the time period, depending on its phase and relative amplitude substantially as follows:

| phase and relative amplitude | data word |
|---|---|
| +0 | 000 |
| +1 | 001 |
| +2 | 010 |
| +3 | 011 |
| −4 | 100 |
| −3 | 101 |
| −2 | 110 |
| −1 | 111 | where the leftmost bit of each data word is the most significant bit; and a correction circuit means coupled to an input of said adder means for delivery thereto a number equal to the number of zeros in the binary reference code, plus one.

4. The apparatus described in claim 1 wherein:

said circuit means detects seven different levels of the demodulated received signal during each limited time period, and assigns one of a plurality of one's complement data words to the demodulated received signal during the time period, depending on its phase and relative amplitude substantially as follows:

| phase and relative amplitude | data word |
|---|---|
| +0 | 000 or 111 |
| +1 | 001 |
| +2 | 010 |
| +3 | 011 |
| −3 | 100 |
| −2 | 101 |
| −1 | 110 | where the leftmost bit of each data word is the most significant bit;

a correction circuit means for delivering an amount to the adder means equal to the output of the correlator which receives the most significant bits of the data words.

5. The apparatus described in claim 1 wherein:

said circuit means generate data words in two's complement representation, and including a correction circuit means which delivers an amount to the adder means equal to the number of zeroes, in the reference code plus one.

6. The apparatus described in claim 1 including:

a correction circuit means which generates data words in one's complement representation, said correction circuit means delivers an amount to the adder means equal to the output of the correlator which receives the most significant bits of the data words.

7. The apparatus described in claim 1 wherein:

said receiver circuit means generates two series of multi-bit data words, including the first-mentioned series of data words representing the inphase component of the received signal and a second series of data words representing the quadrature component, and including a second number k of correlators and a second plurality of transform means for transforming a plurality of outputs of the second number k of correlators and adding a plurality of results to said adder means.

8. Apparatus for generating an output indicating the degree of correlation, in both amplitude and phase, between a reference phase code which comprises a series of binary levels, or bits, and a received data signal which varies in both amplitude and phase, comprising:

means responsive to a received data signal for generating a series of multi-bit data words, each data word representing both the phase and the amplitude of the received signal at a given time, with one bit of each word being a phase bit representing the phase of the signal and the other bit positions of each word being amplitude bits representing the amplitude of the signal;

a plurality of amplitude correlator means, each having a first input for receiving a single amplitude bit of predetermined significance of each data word generated by said generating means, and each having a second input for receiving a series of bits of a reference phase code, for generating a digital correlator output number representing the degree of correlation of a series of bits of the same significance in said series of data words with the series of bits of the reference phase code;

means for leftward shifting the output of each amplitude correlator means by a number of places equal to the position of the bit of the data word received by that correlator means, wherein the output of the correlator means that receives the least significant bit is shifted by zero, the output of the correlator means that receives the next to least significant bit is shifted by one, and so forth for any additional amplitude correlator means, to produce a multiplied correlator means output for each correlator means, and means for adding the multiplied correlator means outputs.

9. The apparatus described in claim 8 wherein:

the phase bit of each data word is the most significant bit (MSB) of the data word, and including;

a phase bit correlator means which has a first input for receiving the MSB of each of a series of data words, and a second input for receiving the series of bits of said reference phase code, for generating an output number representing the degree of correlation of the series of signals received on its inputs;

said shifting means also shifts the output of the phase bit correlator by a number of places equal to the number of bits in each data word, generates the bit complement of the result, and adds the bit complement to the sum of the results obtained by shifting the output of each amplitude correlator means; and correction circuit means for delivering a correction number to said means for adding, said means for adding constructed to add said correction number to said multiplied correlator means outputs.

10. The apparatus described in claim 8 wherein:

said means for generating data words generates data words in two's complement representation, and including a correction circuit means which delivers a correction number to said means for adding equal to the number of zeroes in the reference code, plus one.

11. The apparatus described in claim 8 wherein:

said means for generating data words generates data words in one's complement representation, and including a correction circuit means which delivers a correction number to said means for adding equal to the output of the phase bit correlator.

12. A method for soft limiting pulse compression of phase-modulated received signals, with respect to a binary reference phase code, comprising:
generating a series of multibit data words representing a demodulated received signal with a phase bit of each data word representing the phase of the received signal during the limited time period, and the remaining bits of each data word being amplitude bits representing the amplitude of the received signal during said limited time period;
inputting to each of a plurality of amplitude correlators which each have a different significance position, an amplitude bit of a different significance, said amplitude bits representing the amplitude of each of a series of said data words, and also inputting to each amplitude correlator a reference phase code, and generating an output from each correlator representing the correlation of the inputs thereto;
generating a sum which varies directly with the sum of the binary output of each amplitude correlator when each bit of the binary output of the correlator is shifted toward a higher significance position by a number of shifts equal to the significance position of the correlator, with the bits of the binary output of a least significant bit (LSB) correlator which receives data word bits of the LSB position shifted zero places, the output of a second from LSB correlator which receives data word bits of the second from LSB position shifted once, and so forth.

13. The method described in claim 12 including:
inputting to a phase correlator, a series of said phase bits of a series of data words, also inputting to said phase correlator said reference phase code, and generating an output from said phase correlator representing the correlation of the inputs thereto;
said step of generating a sum includes also adding a bit complement of the output of said phase correlator when shifted by a number equal to the significance position of the phase bits, plus a correction number dependent on the number representation of the data words.

14. The method described in claim 13 wherein:
said data words are in two's complement representation, and said correction number equals the number of bits of lower amplitude in the phase reference code, plus one.

15. The method described in claim 13 wherein:
said data words are in one's complement representation, and said correction number equals the output of said phase correlator.

* * * * *